United States Patent [19]

Netzel

[11] 4,377,290
[45] Mar. 22, 1983

[54] SYMMETRICAL SEAL PACKAGE FOR MULTIPLE FACE SEALS

[75] Inventor: James P. Netzel, Skokie, Ill.

[73] Assignee: John Crane-Houdaille, Inc., Chicago, Ill.

[21] Appl. No.: 360,581

[22] Filed: Mar. 22, 1982

[51] Int. Cl.³ .............................................. F16J 15/34
[52] U.S. Cl. ...................................... 277/38; 277/40; 277/65; 277/93 R
[58] Field of Search ...................... 277/35, 37, 38-43, 277/47, 51, 52, 65, 81 R, 82, 85, 93 R, 93 SD

[56] References Cited

U.S. PATENT DOCUMENTS

| | | | |
|---|---|---|---|
| 2,467,960 | 4/1949 | Brady | 277/37 |
| 2,472,264 | 6/1949 | Payne | 277/93 X |
| 3,333,856 | 8/1967 | Voitik | 277/65 X |
| 3,746,350 | 7/1973 | Mayer et al. | 277/67 |
| 3,874,678 | 4/1975 | Potter | 277/29 |
| 3,877,706 | 4/1975 | Haas et al. | 277/93 X |
| 4,294,454 | 10/1981 | Cannings | 277/65 |

FOREIGN PATENT DOCUMENTS

| | | | |
|---|---|---|---|
| 1138637 | 1/1957 | France | 277/42 |
| 55-36646 | 3/1980 | Japan | 277/65 |
| 55-36647 | 3/1980 | Japan | 277/65 |
| 756725 | 9/1956 | United Kingdom | 277/65 |
| 1378002 | 12/1974 | United Kingdom | 277/85 |
| 750130 | 7/1980 | U.S.S.R. | 277/65 |

OTHER PUBLICATIONS

*Industrial Sealing Technology*, H. Hugo Buchter, published in 1979 by John Wiley and Sons, New York pp. 213-214.

*Primary Examiner*—Robert S. Ward, Jr.
*Attorney, Agent, or Firm*—Dorsey L. Baker

[57] ABSTRACT

A symmetrical package seal containing two balanced end face seals, the stationary components being adapted for use with shafts of different sizes. In addition, the package seal has means for centering the rotating components relative to the stationary components, for aligning the sealing faces parallel contact, and for bleeding fluid from the chamber formed by the end face seals.

5 Claims, 4 Drawing Figures

SYMMETRICAL SEAL PACKAGE FOR MULTIPLE FACE SEALS

BACKGROUND OF THE INVENTION

Mechanical end face seals have long been used to seal the space between a housing and a rotating shaft which passes through the housing. Such seals usually include a primary ring which has a radial sealing face and is mounted on the shaft by a secondary seal such as an O-ring. In addition, the seal includes a fixed mating ring mounted in the housing. Like the primary ring, the mating ring has a radial sealing surface. The two radial surfaces are biased into sealing engagement.

These seals were developed as a substitute for packing—a braided, flexible material which was stuffed into the space between the shaft and the housing and compressed by a gland plate. Being a substitute for packings, many end face seals were designed with dimensions which would permit their installation in the same space. Thus dimensional, installation and maintenance challenges arose.

Still later, these challenges were magnified by pumps generating higher pressures and exposed to corrosive or toxic liquids. Engineers responded with designs of end face seals in "tandem" or in "double"—often designing them to fit in the same space as the earlier packings. The latest developments are directed to a package seal, e.g. an integral unit mounted on a sleeve to facilitate installation over the shaft and to avoid alignment problems between the seal faces.

As a result of these developments, numerous designs are available—each seal and its parts being dimensioned for a specific size of shaft and housing. Consequently, present seal designs lack versatility. Neither the overall design nor the individual parts can be easily fitted to different shafts and different housings. Moreover, these cartridge designs do not facilitate pretesting, and often have rotating parts which are disposed outside the housing.

An illustration of these designs is depicted in *Industrial Sealing Technology*, H. H. Buchter, at FIG. 2.48. This illustration depicts double seals mounted on a sleeve, one of the seals extending into the housing and the other exposed outside the housing. Only two parts of the seal (the primary rings) have the same dimensions, and the clearances are such that the seal parts cannot be adapted to fit other shaft sizes.

SUMMARY OF THE INVENTION

To provide versatility and to reduce sealing costs, my invention is a package seal which includes an external seal housing and an internal sleeve which receives and encloses two symmetrical end face seals. Except for the sleeve, all other components are designed for use with shafts and housings of different sizes. Only the sleeve requires dimensional changes to fit different shaft sizes. The end face seals are completely enclosed by the housing and can be pretested without special fixtures.

Accordingly, the objects of my invention are to provide (a) a package assembly with symmetrical, identical components to facilitate manufacture and assembly;

(b) a package seal assembly in which component parts (except for the sleeve) can be designed to fit a plurality of different sizes;

(c) a package seal assembly which can be pretested without special fixtures; and (d) a package seal assembly in which the rotating parts are enclosed.

DESCRIPTION OF THE DRAWINGS

The manner in which these and other objects of my invention are attained is disclosed in the attached specifications and drawings in which.

DETAILED DESCRIPTION

Figure 1:
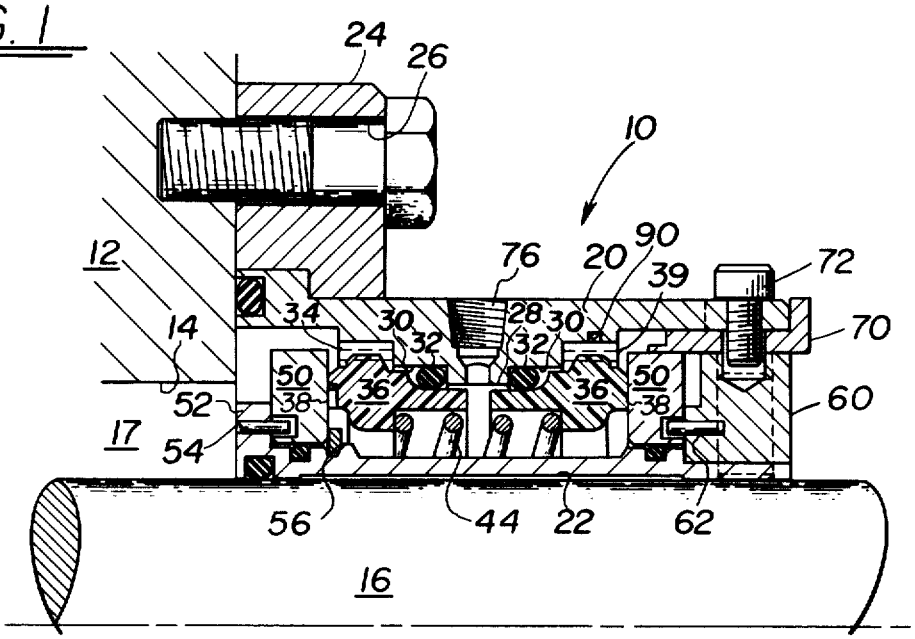
FIG. 1 is a side elevational view, in section, of the preferred embodiment shown in conjunction with a pump or agitator housing, the section being taken through the vertical centerline.
Figure 2:
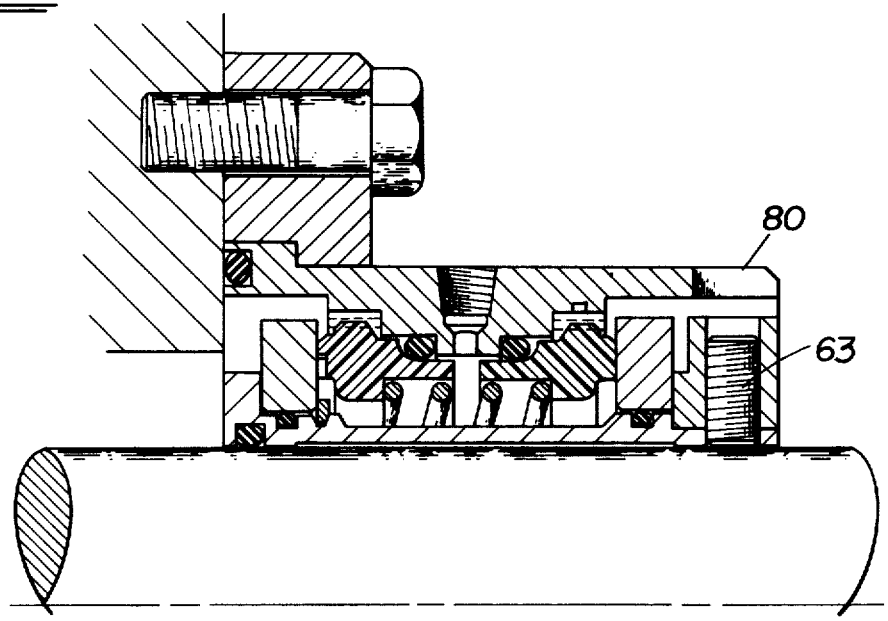
FIG. 2 is a side elevational view, in section, taken at an angle to the section of FIG. 1. In this drawing the seal has been affixed to the rotating shaft.

The preferred embodiment 10 of my invention is depicted in FIGS. 1 and 2 in association with a pump or agitator housing 12. An aperture 14 in the housing receives a rotating shaft 16 which may drive a pump or an agitator (not shown). Unless sealed, the annular space 17 between the shaft 16 and the housing 12 would permit leakage of fluid.

As previously noted, packings and end face seals have been installed within this space to preclude leakage. As shown in FIG. 1, the preferred embodiment of my seal is mounted in its entirety, outside of the housing.

Mounting of the invention is simple. Since it is designed as a package unit, the individual parts need not be assembled on the shaft. Instead, the parts are delivered as a package which is telescoped over the shaft as a unit and affixed in sealing relation to the housing 12 and the shaft 16 as subsequently explained.

The package seal has inner and outer cylindrical members 20 and 22 of a length necessary to encapsulate all of the rotating parts. Thus, the outer member 20 shields the rotating parts from exposure. A gland plate 24 is mounted over the outer member 20, as shown, and has apertures or radial slots 26 for bolting the seal to the pump housing 12.

The outer member 20, has an interior surface machined to define generally symmetrical surfaces on opposite sides of a land 28. For example, stepped annular surfaces 30, 30 immediately adjacent the land 28 are machined to receive secondary seals 32, 32 shown in the form of elastomeric O-rings. Outside of the annular surfaces 30, 30 are stepped surfaces which receive retaining bands 39 having lugs which engage slots 40 of the primary seal rings 34, 34 to prevent their rotation.

These primary rings 36, 36 are identical to one another and are in back-to-back relation, the radial sealing face 38 of each facing outward. These primary seals have slots 40 (see FIG. 3) formed in the larger circumference for receiving the lugs of the retaining bands 39. Preferably the primary rings take the general configuration shown in the drawings. Thus a reduced diameter of the primary ring sealingly engages the secondary seals 32, 32. This reduced diameter, being smaller than that of the radial seal faces 38, permits sealed pressure to act against the left primary ring 36 to urge the seal to the left and provide a closing force. In this sense, the seals are balanced. In addition, the internal surfaces of the primary rings are stepped to define an abutment which receives the bias of spring 44.

As shown in FIGS. 1 and 2, the internal diameter of the outer cylindrical member, its primary rings and the spring is substantially larger than the diameter of shaft 16. Thus these same components may be used for shafts of different sizes.

The inner sleeve member 22 of my invention carries the rotating components of the seals. These include the mating rings 50, 50 which have radially extending sealing surfaces to mate with similar surfaces of the primary ring. The left mating ring 50 is retained in place by a flange 52 extending upward from the sleeve 22. A pin 54 extends from the flange 52 into the mating ring 50 to constrain the latter for rotation with the shaft 16. As shown, the left mating ring 50 is retained against the flange by a "spirolox" ring 56.

The right mating ring 50 is retained in place by a collar 60 which also carries a constraining pin 62 extending into its associate mating ring. This collar 60 is held in place on the sleeve 22 by a plurality of set screws 63.

Figure 3A:
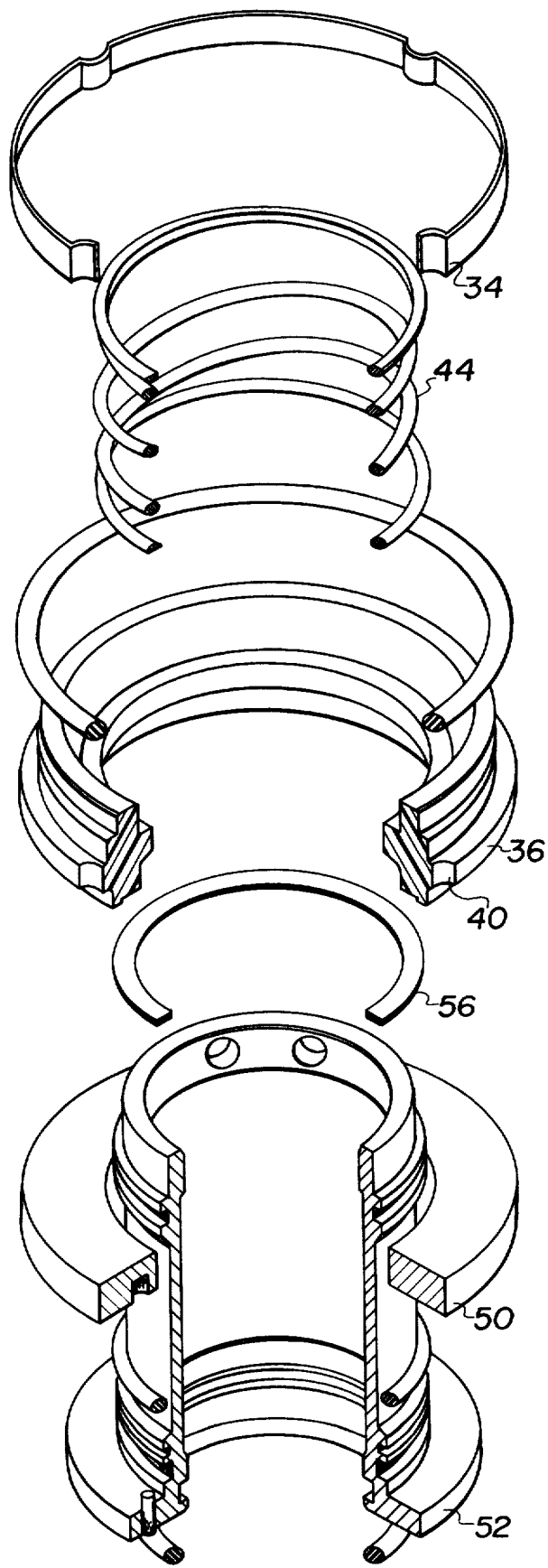
FIGS. 3a and 3b are exploded perspective views of the preferred embodiment illustrating assembly of the seal.
Figure 3B:
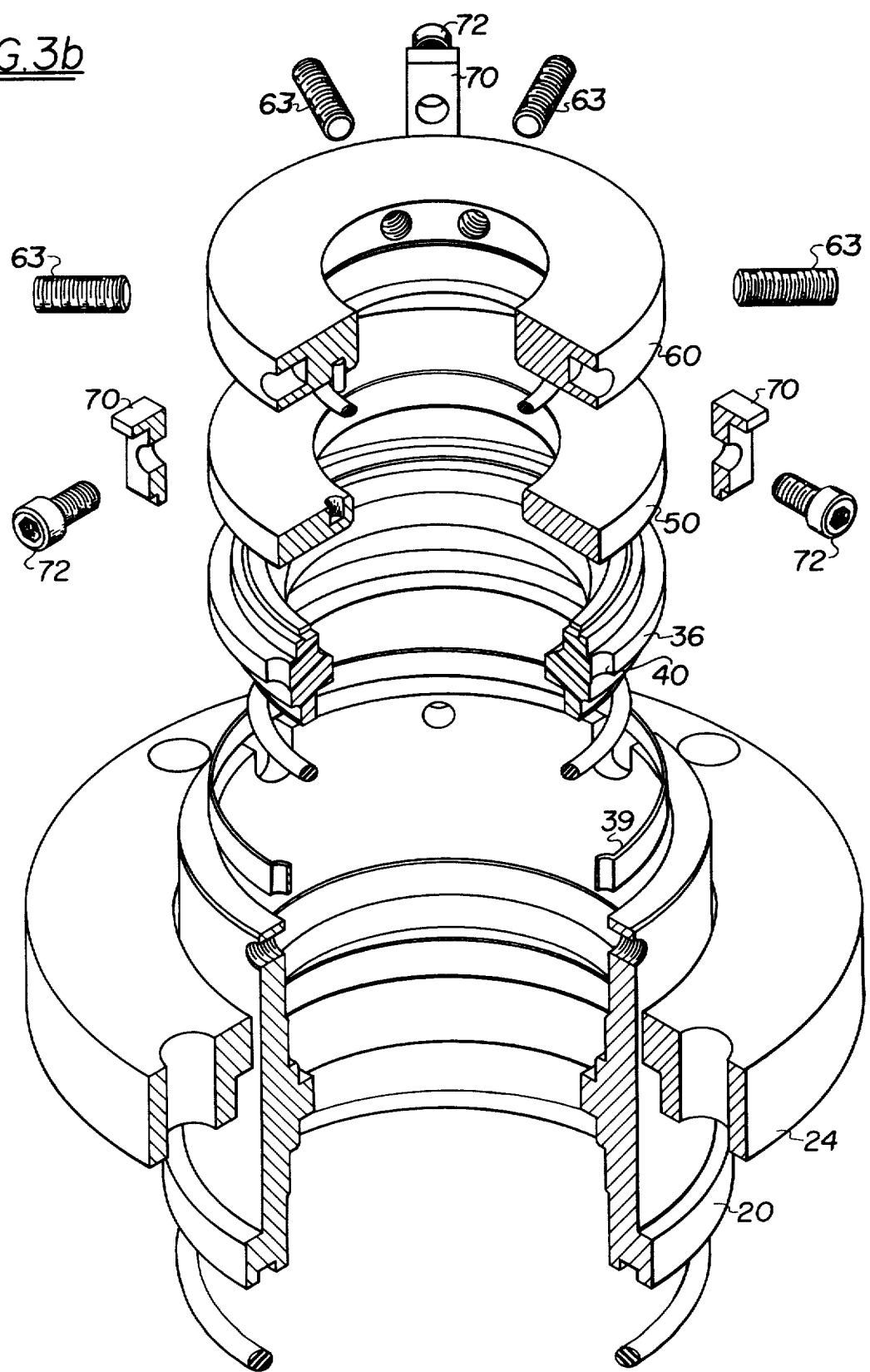

The remaining components are illustrated in the exploded views of FIGS. 3a and 3b. These figures also illustrate the ease of assembly of the seal. Placement of FIG. 3b directly above FIG. 3a discloses that assembly is accomplished by simply telescoping the parts into one another in the order illustrated. After the components are telescoped together, set screws 63 are used to lock the collar 60 to the sleeve 22 and hold the unit together as a package seal.

The last steps in assembly are centering and pretesting. A plurality of spacer tabs 70 are inserted between collar 60 and the outer member 20. These tabs center the inner sleeve 22 relative to the outer member and align the seal faces parallel to one another. Bolts 72 are then screwed through the outer member 20 through the tabs 70 to hold the components in a centered package. When so assembled, the unit may be pretested by admitting fluid under pressure through tap 76 into the chamber defined by the two end face seals. The absence of leakage confirms proper assembly.

After pretesting or upon installation, fluid in the chamber between the seals can be easily bled. To accomplish bleeding, recesses 80 are milled into the outer member 20. These recesses are wide enough to allow the tabs to be extended into the seal housing to engage and retract primary ring 36 from its seated relation with mating ring 50. Upon retraction, the test fluid will leak out through the separated seal faces.

To install the seal, the package is merely slipped over the shaft 16 and bolted to the housing 12. Then set screws 62 are tightened against the shaft. O-rings which are depicted, but not specifically numbered, will seal the outer member 20 against the housing, and the inner member against the shaft 16. At this time, the spacer tabs may be removed.

If desired, my seal can be operated with a buffer fluid or pressurized fluid in the chamber defined by the two end face seals. This fluid may be connected to a reservoir through tap 76. Another tap, not shown, can be used to connect the buffer fluid to a reservoir return line. Upon installation, the spaced tabs may again be inserted into the package to retract the primary seal and bleed off the air to permit the chamber to be filled with fluid.

My invention may take other forms and configurations. In addition, the same inner and outer members 20, 22 may be used to package a single seal. For example, the outboard end face may be omitted in its entirety. For this purpose, an annular groove 90 is milled in the outer member to receive a lock ring (not shown). This lock ring could be used to support a washer which would serve as a reaction surface for spring 42.

I claim:

1. A symmetrical package seal comprising
    a. inner and outer concentric cylindrical members defining a seal package for sealing the space between a rotatable shaft and a housing, said outer member having a flange for affixing said seal package to the housing and said inner member adapted to sealingly engage the shaft;
    b. said outer member having an internal surface configuration defining two spaced apart secondary seal seats for receiving two primary seal rings;
    c. said inner member having a backing collar at opposite ends thereof; and
    d. balanced radial end face seals positioned within said package in back to back relation to define a fluid chamnber within said package, said seals comprising identical mating rings mounted on said inner member and having a radially extending sealing surface; identical primary seals mounted in driving sealing relation in said outer member and having radial sealing surfaces in sealing engagement with said mating rings.

2. A seal package as recited in claim 1 in which end face seals are mounted in back to back relation.

3. A seal package as recited in claim 2 in which a single spring is used to bias said primary rings into sealing engagement.

4. A package seal comprising:
    a. inner and outer cylindrical members concentric to one another; said outer cylindrical member having a flange for affixing said seal to a housing;
    b. multiple radial end face seals mounted within said cylindrical cylinders defining a chamber for a buffer fluid;
    c. removable connecting means for locking said inner and outer cylindrical members in position for shipping the unit as a package and for bleeding fluids from the chamber, said connecting means including an elongated spacer means positioned between said inner and outer members and pin means extending from said outer member through said spacer means and into said inner member.

5. A symmetrical package seal comprising
    a. an outer cylindrical member adapted to be mounted over a shaft and affixed to a housing;
    b. identical primary seal rings mounted in said outer member in back to back relation and having a driving connection to said outer member, said primary rings and outer member having dimensions for receiving shafts of different dimensions;
    c. secondary seal members comprising O-rings mounted in sealing relationship between said primary rings and said outer member;
    d. bias means extending between said primary rings;
    e. an inner sleeve member adapted to be sealing engaged over a shaft extending into said housing;
    f. identical mating rings mounted on said sleeve member for mating with said primary rings in sealing engagement.

* * * * *